United States Patent [19]

Köthe et al.

[11] 4,237,411

[45] Dec. 2, 1980

[54] CHARGE MAINTENANCE AND CONTINUOUS CHARGING FOR STORAGE BATTERIES

[75] Inventors: Hans K. Köthe, Kelkheim; Günter Strasen, Neu-Isenburg, both of Fed. Rep. of Germany

[73] Assignee: Varta Batterie, A.G., Hanover, Fed. Rep. of Germany

[21] Appl. No.: 941,231

[22] Filed: Sep. 11, 1978

[30] Foreign Application Priority Data

Oct. 29, 1977 [DE] Fed. Rep. of Germany ....... 2748644

[51] Int. Cl.³ ................................................. H02J 7/04
[52] U.S. Cl. ...................................... 320/21; 320/22; 320/35

[58] Field of Search ..................... 320/20, 21, 22, 35, 320/36

[56] References Cited

U.S. PATENT DOCUMENTS

| | | | |
|---|---|---|---|
| 2,715,710 | 8/1955 | Godshalk et al. | 320/35 X |
| 3,252,070 | 5/1966 | Medlar et al. | 320/21 |
| 3,487,284 | 12/1969 | Cady | 320/21 X |
| 3,595,707 | 5/1971 | Stephens | 320/22 X |
| 3,614,584 | 10/1971 | Burkett et al. | 320/35 |
| 3,944,904 | 3/1976 | Hase | 320/21 X |

Primary Examiner—Robert J. Hickey
Attorney, Agent, or Firm—Weiser, Stapler & Spivak

[57] ABSTRACT

After-charge current is supplied at intervals T for periods $T_N$ at intensities determined by the prevailing battery temperature.

7 Claims, 5 Drawing Figures

CHARGE MAINTENANCE AND CONTINUOUS CHARGING FOR STORAGE BATTERIES

This invention relates to a method of charge maintenance and continuous charging of storage batteries, and particularly of nickel-cadmium storage batteries with sinter plates, by periodic introduction of charge quantities with predetermined programmed relationships.

Methods of charge maintenance in storage batteries are known. However, they are not necessarily universally applicable. This is due to the fact that two phenomena are encountered with increasing cell temperature (a) the self-discharge increases (b) for a given charging current the charging potentials decrease.

For a charging current maintained at constant intensity, this has the result that (a) above a predetermined temperature the self-discharge losses can no longer be replaced, (b) higher nickel oxides of the positive electrode which are decomposed through self-discharge can no longer be reformed, because this is possible only at higher charging potentials.

On the other hand, the consequences of maintaining a constant charging potential include the well-known "thermal run-away effect", which prevents this charging method particularly in the case of gas-tight Ni/Cd storage batteries, and which can be carried out on vented Ni/Cd-storage batteries only at relatively low potentials.

In the case of two known methods of intermittent charging, this limitation to such low potential values does not apply. In the first method, the after-charging is initiated upon reaching of a predetermined lower potential limit, and is terminated upon reaching of a higher potential limit (intermittent charging between two reference voltages).

In the second method, the charging is controlled with respect to time. In that case, there is ordinarily provided a fixed relationship between turn-on and turn-off periods (time controlled intermittent charging).

Both of these last-mentioned methods operate ordinarily with a predetermined, relatively high after-charge current. Although this enables the charge potentials to assume higher values at the higher current than during continuous charging with low current, optimum charging is not necessarily assured at either high or extremely low temperatures. This is because account is not taken, on the one hand, of the fact that at high temperatures the charging current must sometimes be even further increased, because the self-discharge losses are higher, and because the charging voltage must be raised to the value required for the production of the higher nickel oxides. On the other hand, account is not taken of the fact that at a cell temperature which is substantially below normal room temperature, the charging current must be reduced, because the self-discharge is then so low that the fixed after-charge current can no longer be accepted by the cell throughout the predetermined period, with the result that an impermissibly high charging potential is built up, which ultimately leads to decomposition of water.

Accordingly, it is an object of this invention to provide a charging method which optimally compensates for the losses due to self-discharge, and at the same time also fully maintains the charged state. At the same time, hydrogen evolution is to be prevented in gas-tight cells at all operating temperatures which may be encountered and, in open cells, water consumption is to be minimized.

These and other objects which will appear are achieved in accordance with the invention by supplying to the storage battery during predetermined periods, extending over an also predetermined after-charge time span, a current whose intensity is determined by the prevailing storage battery temperature.

In what follows, the charge quantitites which are thus supplied to the storage battery will be referred to as charge packets.

For gas-tight storage batteries the invention involves maintaining the arithemtic average of the charging current constant for the duration of a charge packet. In so doing, its magnitude is proportioned to the prevailing storage battery temperature. The same applies for open storage batteries, provided a predetermined limiting potential is not reached during the after-charging. If that occurs, then the charging is continued up to the end of the charge packet at this limiting potential and with decreasing current. This insures that a higher charge quantity is supplied at high temperatures, when the required charge limiting potentials are not encountered, whereas only low charge quantities are supplied at lower temperatures at which the charge limiting potential is reached prematurely.

The discussion which follows further describes the invention with reference to the drawings wherein.

Figure 1:
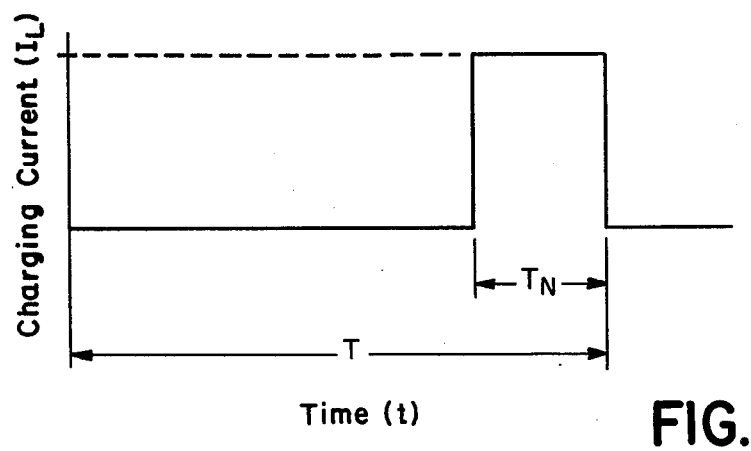
FIG. 1 illustrates a typical after-charge interval for gas-tight cells.

As shown n FIG. 1, the after-charge interval has the duration T and the after-charge period $T_N$ (duration of the charge packet). The after-charge period $T_N$ is preferably between 0.5 and 10 minutes per time interval T. Over time t, the charging current which is dependent upon storage battery temperature, has the arithematic average value $I_L$. This may be not only the average value of a DC current, but also that of a current with superposed ripples. This interval T may, for example, equal one hour.

Figure 2:
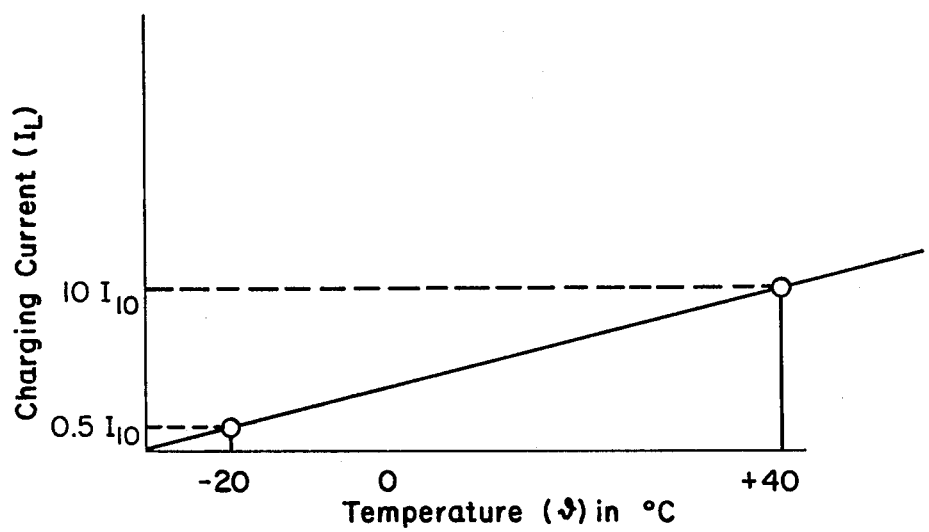
FIG. 2 shows the typical dependence of the average value of the after-charge current upon the temperature of the storage battery.

FIG. 2 shows the typical relationship of the average value of the after-charge current $I_L$ upon the temperature $v$ of the storage battery. As shown in this Figure, the average value is preferably chosen to be $10I_{10}$ at 40° C. ($1C_{10}A$). In this expression $I_{10}$ denotes the current by means of which the fully charged storage battery delivers its rated capacity at standard temperature within ten hours. In a storage battery with a rated capacity of 15Ah, $I_{10}$ therefore equals 1.5A. In contrast, at $-20°$ C. the average value is pegged at only $0.5\ I_{10}$ ($0.05\ C_{10}A$).

Figure 3:
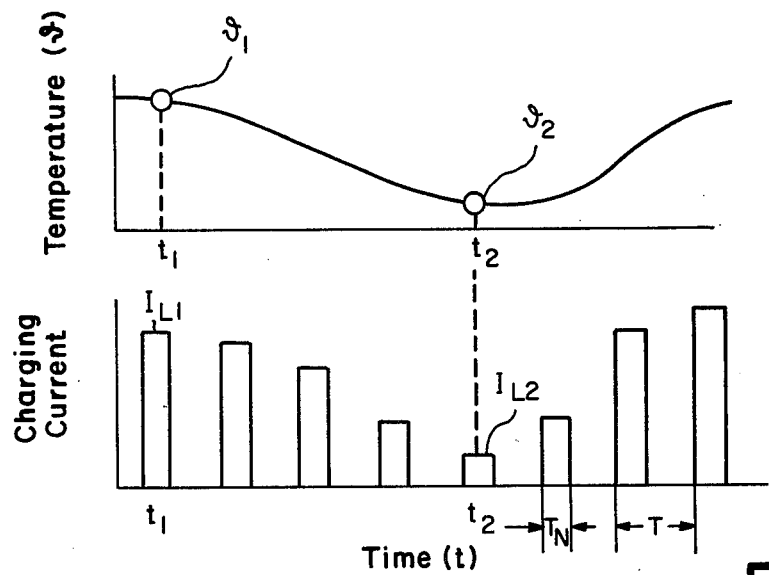
FIG. 3 shows a series of intervals for varying storage battery temperatures.

FIG. 3 shows a series of time periods extending over time t for varying storage battery temperature $v$. Initially, at time $t_1$ this temperature is high ($v_1$), which is associated with high self-discharge and low internal battery resistance. The after-charge current $I_L$ which is supplied to the storage battery in accordance with FIG.

2 has a correspondingly high value $I_{L1}$, and produces during the after-charge period $T_N$ not only sufficient after-charging but also the required after-charge voltage. At $t_2$ the storage battery temperature $v$ is low; the self-discharge losses are low, and the internal resistance of the storage battery is relatively high. The charging current $I_{L2}$ corresponding to this temperature produces only very slight after-charging and simultaneously prevents exceeding of the charge limiting voltage.

The relationships shown in FIGS. 1 through 3 also apply to open storage batteries with sinter electrodes with the following exception: the arithemtic average of the charging current is constant in conformity with FIG. 2 only as long as a predetermined upper limiting voltage is not exceeded, in order to reduce the water decomposition which occurs during the intermittent charging operation.

Figure 4:
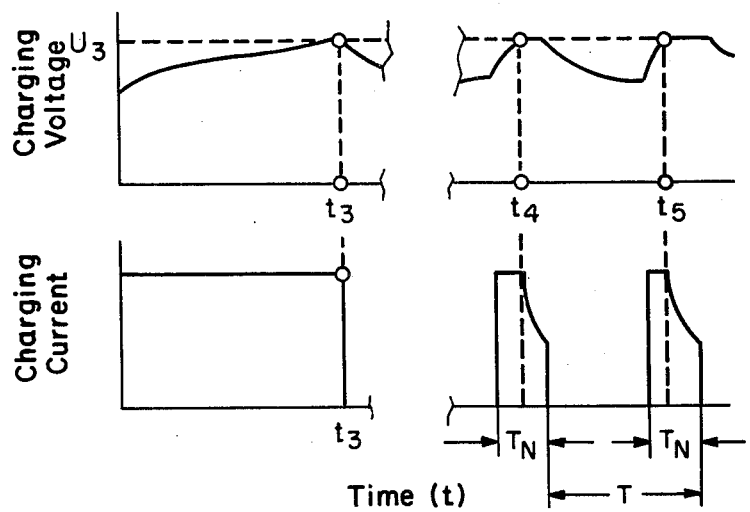
FIG. 4 shows the variations in charging current for open alkaline storage batteries, before and after attainment of the fixedly predetermined limiting voltage.

FIG. 4 shows such charging current and voltage curves for open alkaline storage batteries. The principal charging phase, using the temperature determined charging current $I_L$, ends at time $t_3$ upon reaching the charge limiting voltage $U_3$. Thereafter, the charging continues with time-controlled charge packets. Because in the ensuing time span the cell potential rises more and more quickly toward the value $U_3$, the fraction of the after-charge interval using charging current $I_L$ diminishes, whereas the after-charge interval with decreasing current increases. This is due to voltage limitation to $U_3$ at times $t_4$ and $t_5$ during the after-charge timespan. Together with the duration of the charge maintenance operation, the charge packets correspondingly become progressively smaller. For a better overall view the time axis t is broken in FIG. 4 and only two after-charge periods $T_N$ are illustrated.

With this method using charge packets it is possible to automatically achieve 100% fully charging for open alkaline storage batteries. Thereafter only the self-discharge losses are replaced by means of the same or reduced charge packets. The discharge limiting voltage $U_3$ is preferably so chosen that the water decomposition is kept low, on the one hand, while on the other formation of the higher nickel oxides is assured.

Figure 5:
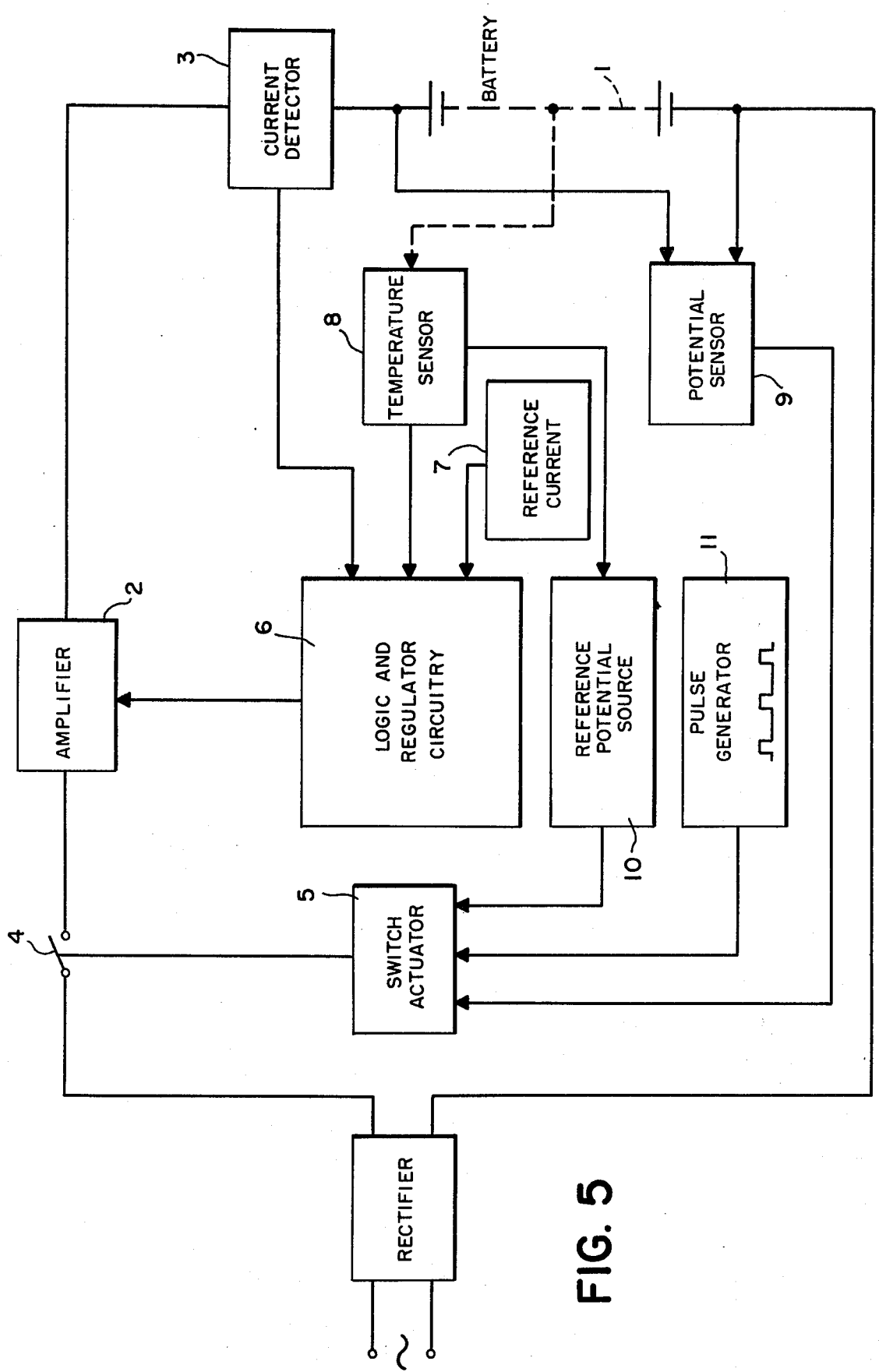
FIG. 5 diagrammatically illustrates apparatus for practicing the invention.

FIG. 5 diagrammatically illustrates by means of a block diagram a charging equipment for carrying out the charging method embodying the invention.

This equipment includes, connected in circuit with battery 1, an amplifier 2 and an actual current value detector 3, as well as a switch 4 operable by means of turn-off switch actuator 5. The actual value of the current is compared via a logic and regulator circuit 6 with a reference value established by circuit 7. Determination of the reference value takes place in response to a temperature sensor 8. Turn-on and turn-off takes place in response to potential sensor 9, pulse generator 11, and the turn-off means 4, 5. If desired, the reference potential value is modified in known manner by a reference potential source 10 controlled by the temperature sensor 8.

We claim:

1. A method of charge maintenance and continuous charging of storage batteries, and particularly of nickel cadmium batteries with sinter plates, through periodic supplying of charge quantities with predetermined programmed relationships, the method comprising supplying to the storage battery at predetermined substantially uniform intervals T a current $I_L$ lasting for an also predetermined substantially uniform after-charge period $T_N$, the intensity of said current being determined by the prevailing storage battery temperature $v$ so as to increase with increasing temperature and decrease with decreasing temperature.

2. The method of claim 1 wherein
the charge quantities are supplied by a DC current with ripples, and whose arithmetic average corresponds to the temperature-controlled charging current $I_L$.

3. The method of claim 1 wherein, during any given after-charge period $T_N$, the current $I_L$ of intensity determined by the storage battery temperature is supplied only until a limiting voltage $U_3$ is reached, and
thereafter the charging is continued at the said limiting voltage $U_3$ with decreasing current up to the end of the given after-charge period $T_N$.

4. The method of claim 1 wherein
the after-charge period $T_N$ has a duration of between 0.5 and 10 minutes per interval T.

5. The method of claim 4 wherein
the interval T has a duration of about one hour.

6. The method of claim 1 wherein the value of the current $I_L$ is approximately $10I_{10}$ at 40° C.

7. The method of claim 3 wherein
the battery is an open alkaline storage battery, and
the duration of the portion of the after-charge period $T_N$ during which the current intensity $I_L$ is determined by battery temperature progressively decreases.

* * * * *